(No Model.)
R. EMERSON.
BRIDLE BIT.
No. 444,629. Patented Jan. 13, 1891.
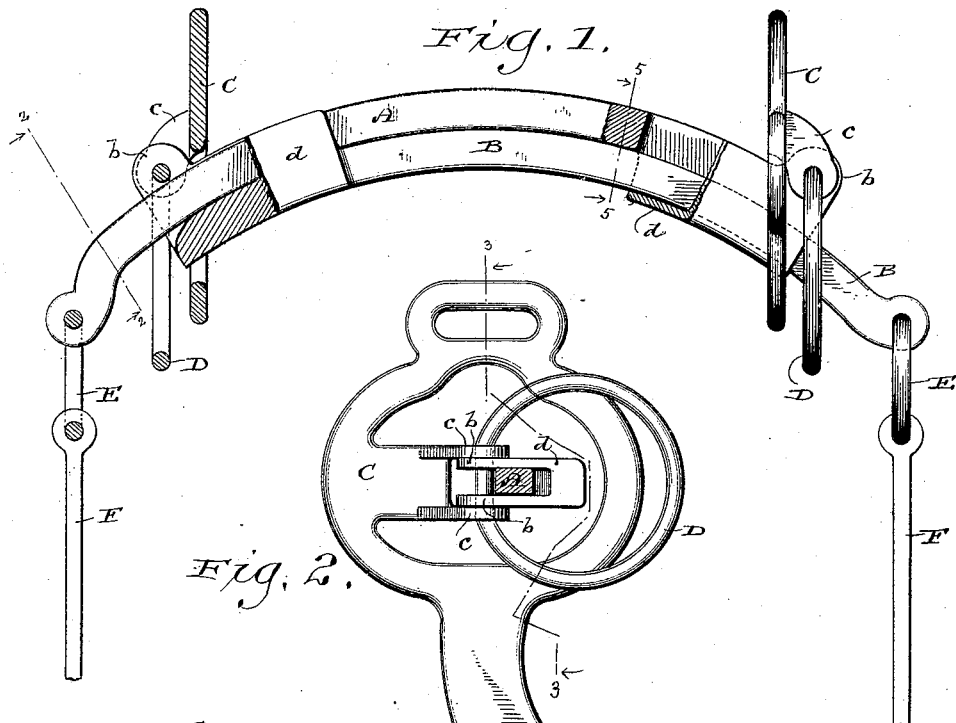

UNITED STATES PATENT OFFICE.

RICHARD EMERSON, OF RACINE, WISCONSIN, ASSIGNOR OF ONE-HALF TO WILLIAM H. PUGH, OF SAME PLACE.

BRIDLE-BIT.

SPECIFICATION forming part of Letters Patent No. 444,629, dated January 13, 1891.

Application filed August 4, 1890. Serial No. 360,862. (No model.)

*To all whom it may concern:*

Be it known that I, RICHARD EMERSON, of Racine, in the county of Racine, and in the State of Wisconsin, have invented certain new and useful Improvements in Bridle-Bits; and I do hereby declare that the following is a full, clear, and exact description thereof.

My invention relates to bridle-bits; and it consists in certain peculiarities of construction and combination of parts, to be hereinafter described with reference to the accompanying drawings and subsequently claimed.

In the drawings, Figure 1 represents a plan view of my bridle-bit partly in horizontal section; Fig. 2, an end view partly in transverse section on line 2 2 of the preceding figure; Fig. 3, a section on line 3 3 of Fig. 2; Fig. 4, a detail plan view partly in section, and Fig. 5 a transverse section on line 5 5 of Fig. 1.

Referring by letter to the drawings, A B represent the mouth-bars and C the cheek-plates of my bit, these cheek-plates being of any suitable design, but preferably of the skeleton form shown in the drawings. Extended from the outer side of each cheek-plate are lugs $c$, that register with other lugs $b$ on the laterally-enlarged and recessed end of an adjacent mouth-bar, and this mouth-bar and said cheek-plate are connected by a ring D engaging said lugs. The mouth-bar A is thus hinged to one of the cheek-plates and the mouth-bar B likewise connected to the other of said cheek-plates. The laterally-enlarged and recessed end of each mouth-bar forms a guide $d$ for the reduced portion of the other mouth-bar, and thus said mouth-bars are telescoped one upon the other, these mouth-bars being preferably curved. The free end of each mouth-bar is provided with a ring E for connection with a driving-rein F, as best illustrated in Fig. 1.

By the construction above described it will be seen that while the pull of a horse on the bit will be against the mouth-bars the latter will not slide in their guides, or, in other words, telescope on each other when the driving-reins are drawn straight back, and consequently the cheek-plates will not press against the jaws of the animal to punish the same, no matter how much power may be exerted in the direct line of draft. However, if the horse is fractious and it is requisite that the cheek-plates be brought into play, so as to clamp against the jaws of the animal, a slight lateral movement of the driver's hands will cause the mouth-bars to telescope or slide one upon the other and thereby accomplish the desired result, the amount of pressure being due to the power exerted by the driver. The same result may be attained by pulling straight on one driving-rein and sidewise on the other. When the reins are slackened, the pull of the horse will cause a reverse movement of the mouth-bars on each other and relieve the pressure of the cheek-plates.

By connecting the driving-reins to the rings D E, as illustrated in Fig. 4, or to the rings E and cheek-plates C, the mouth-bars A B cannot slide one upon the other to bring said cheek-plates against the jaws of a horse, and thus my device is readily converted into a plain bit for soft-mouthed animals.

A bridle-bit such as I have described is very simple in its construction, and has no springs or other parts liable to get out of order, while at the same time it is of particular value for use with high-spirited and tender-mouthed horses, as the latter may be driven with a tight rein without punishment, or in case of hard-mouthed fractious horses the pressure of the cheek-plates may be more or less in proportion, as the driver may think proper.

The recessed portions $d$ of the mouth-bars not only serve as guides, as above described, but they also act as guards or shields to prevent injury to the mouth and lips of a horse on which the bit is used, this being of material advantage when said mouth-bars slide one upon the other, because while the animal is punished by the pressure of the cheek-plates there is no irritation of the mouth.

Having thus described my invention, what I claim as new, and desire to secure by Letters Patent, is—

1. A bridle-bit having two mouth-bars, each of which has a laterally-enlarged and recessed end portion loosely engaging the remaining portion of the other and a cheek-plate connected to said end portion of each mouth-bar, substantially as set forth.

2. A bridle-bit having two mouth-bars, each of which has a laterally-enlarged and recessed end portion loosely engaging the remaining portion of the other, a cheek-plate connected to said end portion of each mouth-bar, and rings connected to the free end of the respective mouth-bars, substantially as set forth.

3. A bridle-bit having two mouth-bars, each of which has a laterally-enlarged and recessed portion engaging the remaining portion of the other, lugs on the recessed portions of the mouth-bars, cheek-plates also provided with lugs in register with those aforesaid, rings passed through the registering lugs, and other rings passed through the free ends of said mouth-bars, substantially as set forth.

4. A bridle-bit having two mouth-bars, each of which has a laterally-enlarged portion thereof in the form of a mouth guard or shield, the remaining portion of one mouth-bar arranged to slide in the mouth guard or shield of the other, and cheek-plates connected to the respective mouth-guards, substantially as set forth.

In testimony that I claim the foregoing I have hereunto set my hand, at Milwaukee, in the county of Milwaukee and State of Wisconsin, in the presence of two witnesses.

RICHARD EMERSON.

Witnesses:
N. E. OLIPHANT,
WM. KLUG.